US006775780B1

(12) United States Patent
Muttik

(10) Patent No.: US 6,775,780 B1
(45) Date of Patent: Aug. 10, 2004

(54) DETECTING MALICIOUS SOFTWARE BY ANALYZING PATTERNS OF SYSTEM CALLS GENERATED DURING EMULATION

(75) Inventor: Igor Muttik, Berkhamsted (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/527,385

(22) Filed: Mar. 16, 2000

(51) Int. Cl.[7] .............................................. G06F 13/00
(52) U.S. Cl. ....................... 713/200; 713/201; 713/165
(58) Field of Search ................................ 713/200, 201, 713/202, 165

(56) References Cited

U.S. PATENT DOCUMENTS

| | | | | |
|---|---|---|---|---|
| 5,361,359 A | * | 11/1994 | Tajalli et al. | ................ 713/200 |
| 5,822,517 A | * | 10/1998 | Dotan | ......................... 713/200 |
| 5,842,002 A | * | 11/1998 | Schnurer et al. | .............. 703/21 |
| 5,978,917 A | * | 11/1999 | Chi | ............................. 713/201 |
| 6,073,239 A | * | 6/2000 | Dotan | ......................... 713/200 |
| 6,138,238 A | * | 10/2000 | Scheifler et al. | ............ 713/200 |
| 6,199,181 B1 | * | 3/2001 | Rechef et al. | ................ 714/38 |
| 6,324,647 B1 | * | 11/2001 | Bowman-Amuah | ......... 713/201 |
| 6,385,718 B1 | * | 5/2002 | Crawford et al. | ........... 712/227 |

* cited by examiner

Primary Examiner—Norman M. Wright
(74) Attorney, Agent, or Firm—Silicon Valley IP Group; Kevin J. Zilka; Christopher J. Hamaty

(57) ABSTRACT

One embodiment of the present invention provides a system for determining whether software is likely to exhibit malicious behavior by analyzing patterns of system calls made during emulation of the software. The system operates by emulating the software within an insulated environment in a computer system so that the computer system is insulated from malicious actions of the software. During the emulation process, the system records a pattern of system calls directed to an operating system of the computer system. The system compares the pattern of system calls against a database containing suspect patterns of system calls. Based upon this comparison, the system determines whether the software is likely to exhibit malicious behavior. In one embodiment of the present invention, if the software is determined to be likely to exhibit malicious behavior, the system reports this fact to a user of the computer system. In one embodiment of the present invention, the process of comparing the pattern of system calls is performed on-the-fly as the emulation generates system calls.

27 Claims, 2 Drawing Sheets

DETECTING MALICIOUS SOFTWARE BY ANALYZING PATTERNS OF SYSTEM CALLS GENERATED DURING EMULATION

BACKGROUND

1. Field of the Invention

The present invention relates to systems for detecting malicious computer software. More specifically, the present invention relates to a method and an apparatus for detecting malicious software by analyzing patterns of system calls generated by the software during emulation.

2. Related Art

Malicious software can enter a computer system in a number of ways. It can be introduced on a disk or a CD-ROM that is inserted into the computer system. It can also enter from a computer network, for example, in an email message.

If malicious software is executed by a computer system, it can, cause a number of problems. The software can compromise security, for example, by stealing passwords, by creating a "back door" into the computer system, or by otherwise accessing sensitive information. The software can cause damage to the computer system, for example, by deleting files or by causing the computer system to fail.

Some types of malicious programs can be easily detected using simple detection techniques, such as scanning for a search string. However, this type of detection process can be easily subverted by converting a malicious algorithm into program code in different ways. Furthermore, since most malicious software programs are written in a high-level language, it is hard to analyze these programs because much of the code within them is taken from standard code libraries.

At present, a malicious program is typically analyzed manually by a human expert, who runs the program and observes the results to see if the program exhibits malicious behavior.

A human expert can also decompile the program and remove library code, which enables the human expert to more easily examine the algorithm. In examining the algorithm, the human expert typically pays special attention to system calls (or application program interface (API)) calls) that interact with the computer system and the outside world to determine whether the system calls indicate that the program is likely to exhibit malicious behavior.

Yet another approach is to run a program on a real machine while attempting to intercept malicious actions. This technique, which is known as "behavior blocking," has a number of disadvantages. In spite of the attempt to intercept malicious actions, the program may nevertheless cause harm to the computer system. Furthermore, the behavior blocking mechanism typically cannot view an entire log of actions in making a blocking determination. Hence, the behavior blocking mechanism may make sub-optimal blocking decisions, which means harmless programs may be blocked or harmful programs may be allowed to execute.

What is needed is a method and an apparatus that detects malicious software without requiring manual analysis of the software by a human expert, and without exposing the computer system to potentially malicious actions of the software.

SUMMARY

One embodiment of the present invention provides a system for determining whether software is likely to exhibit malicious behavior by analyzing patterns of system calls made during emulation of the software. The system operates by emulating the software within an insulated environment in a computer system so that the computer system is insulated from malicious actions of the software. During the emulation process, the system records a pattern of system calls directed to an operating system of the computer system. The system compares the pattern of system calls against a database containing suspect patterns of system calls. Based upon this comparison, the system determines whether the software is likely to exhibit malicious behavior.

In one embodiment of the present invention, if the software is determined to be likely to exhibit malicious behavior, the system reports this fact to a user of the computer system.

In one embodiment of the present invention, the process of comparing the pattern of system calls is performed on-the-fly as the emulation generates system calls.

In one embodiment of the present invention, the system emulates the generation of results for system calls, so that the emulation accurately follows an actual execution path through the software.

In one embodiment of the present invention, the software is received on a computer-readable storage medium.

In one embodiment of the present invention, the software is received across a network.

In one embodiment of the present invention, recording the pattern of system calls includes recording parameters of individual system calls within the pattern of system calls.

In one embodiment of the present invention, the system terminates analysis of the software if: a maximum number of instructions are executed during the emulation; a maximum number of system calls are made during the emulation; the emulation completes; or the pattern of system calls is determined to exhibit malicious behavior.

In one embodiment of the present invention, comparing the pattern of system calls includes computing a function of the pattern of system calls.

The present invention provides a number of advantages. Because the system analyzes patterns of system calls, it does not depend upon the specific properties of a high-level language compiler or the geometry of an executable file. (2) A malicious program does not have to be run directly on the computer system in order to detect the potentially malicious activity. Hence, the emulation process is insulated from the host computer system. (3) The system can determine whether a program exhibits malicious behavior based upon patterns Within an entire log of system calls, not just an individual system call. (4) The present invention also generates fewer false alarms because only actually executed code is analyzed. This eliminates the problem of detecting suspicious code fragments which may never be executed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
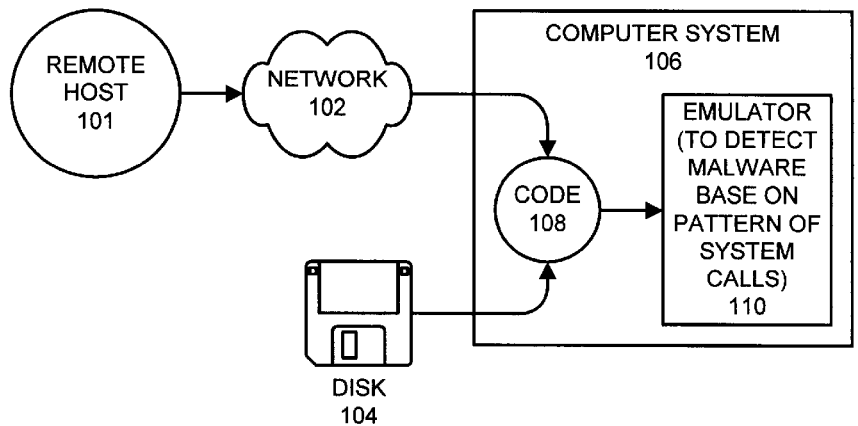
FIG. 1 illustrates a computer system in accordance with an embodiment of the present invention.

FIG. 1 illustrates a computer system 106 in accordance with an embodiment of the present invention. Computer system 106 may include any type of computer system, including, but not limited to, a computer system based on a microprocessor, a mainframe computer, a digital signal processor, a personal organizer, a device controller, and a computational engine within an appliance.

Computer system 106 receives code 108 (which can potentially be malicious) from a number of different sources. Code 108 may be introduced into computer system 106 by a remote host 101 across a network 102. For example, code 108 may be included in an electronic mail (email) message from remote host 101 to computer system 106. Remote host 101 can be any entity that is capable of sending code 108 across network 102. Network 102 can include any type of wire or wireless communication channel capable of coupling together computing nodes. This includes, but is not limited to, a local area network, a wide area network, or a combination of networks. In one embodiment of the present invention, network 102 includes the Internet.

Code 108 may additionally be introduced into computer system 106 by encoding code 108 on a computer-readable storage medium, such as disk 104, and introducing disk 104 into computer system 106. Note that disk 104 can generally include any type of computer-readable storage medium, such as a magnetic disk, a magnetic tape and a CD-ROM.

Before executing code 108, computer system 106 uses emulator 110 to analyze code 108. This analysis involves examining a pattern of system calls (API calls) generated by code 108 in order to detect potentially malicious behavior.

Emulator

Figure 2:
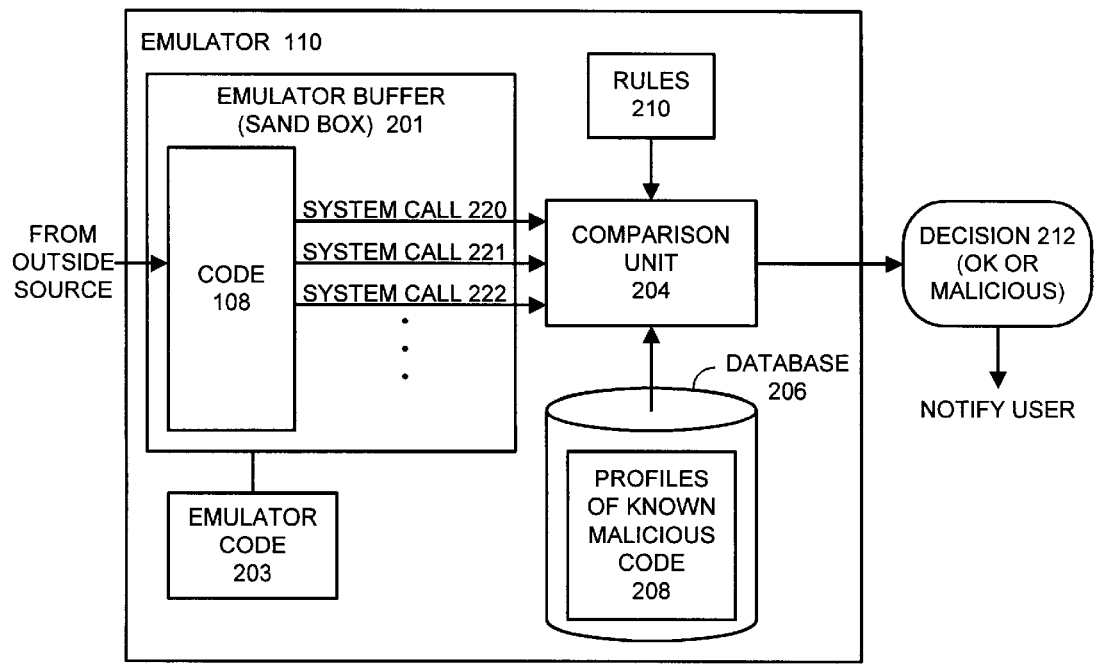
FIG. 2 illustrates the internal structure of an emulator for emulating and analyzing code for malicious behavior in accordance with an embodiment of the FIG. 3 is a flow chart illustrating the process of emulating and analyzing code for malicious behavior in accordance with an embodiment of the, present invention.

FIG. 2 illustrates the internal structure of emulator 110, which emulates and analyzes code 108 in order to detect malicious behavior in accordance with an embodiment of the present invention. Emulator 110 includes emulator buffer 201, emulator code 203, comparison unit 204, database 206 and rules 210. Emulator buffer 201 is a protected region of memory (also known as a sandbox) in which code 108 is stored and emulated. Emulator code 203 includes code to perform the emulation. Emulator buffer 201 and emulator code 203 are designed so that code 108 that is executing within emulator buffer 201 cannot damage or compromise computer system 106.

During the emulation process, code 108 makes a number of system calls 220–222, which feed into comparison unit 204. Comparison unit 204 can include any type of mechanism that can compare system calls 220–222 against profiles of system calls made by malicious programs. Comparison unit 204 takes as input a set of rules 210 and a set of profiles of system call patterns of malicious programs from database 206. Database 206 can include any type of volatile or non-volatile memory or storage device that can be used to store profiles 208. Comparison unit 204 produces a decision 212, which indicates whether or not the code is likely to exhibit malicious behavior. A user of computer system 106 is notified of this decision 212.

In one embodiment of the present invention, comparison unit 204 may perform comparisons on-the-fly as system calls are generated by emulator 110. In another embodiment, comparison unit 204 waits until a number of system calls are generated before performing the comparison.

Also note that emulator code 203 emulates the generation of results for system calls made by code 108, so that the emulation process accurately follows an actual execution path through code 108. Note that the emulated results of system calls do not have to be entirely accurate. They only have to ensure that the execution path through code 108 mirrors what happens during actual unemulated execution of code 108.

Emulation and Analysis Process

Figure 3:
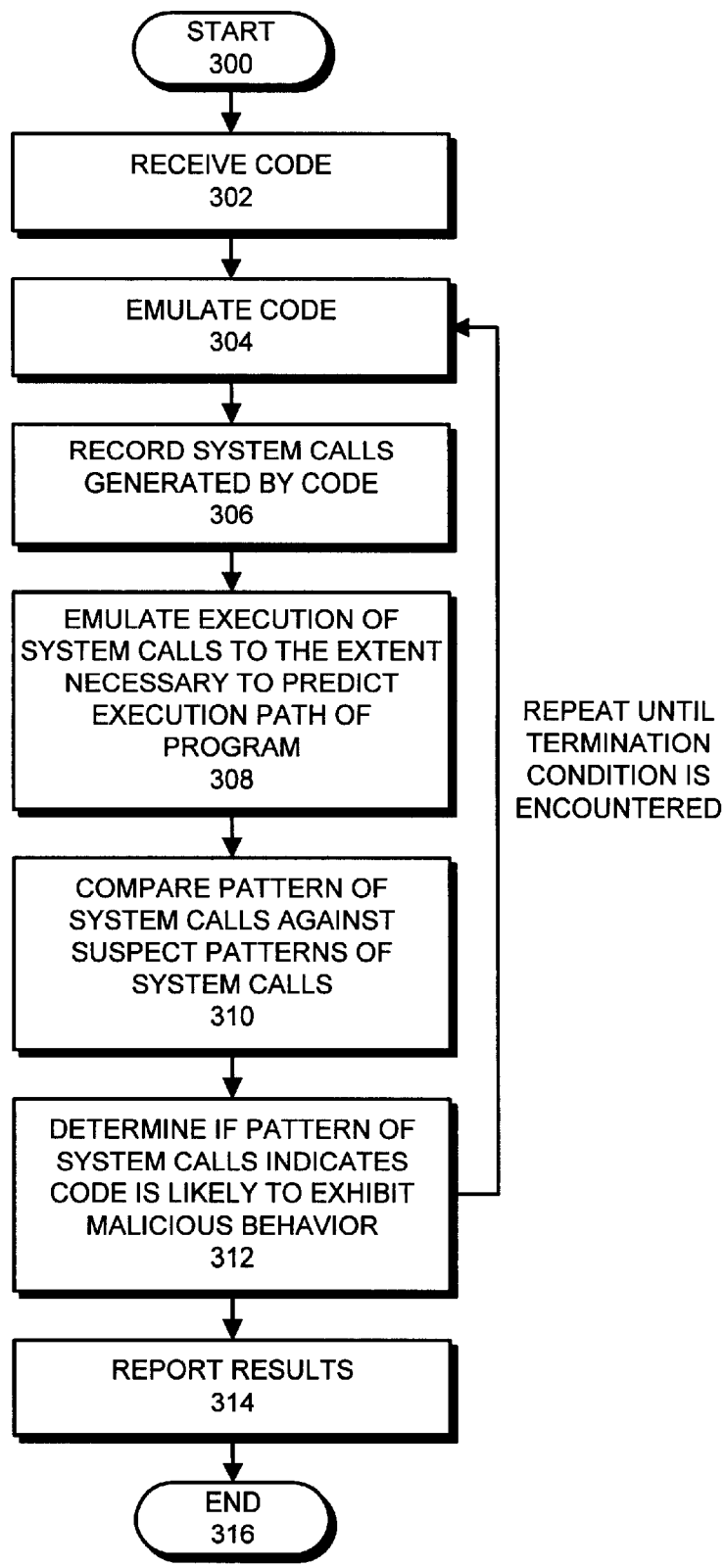

FIG. 3 is a flow chart illustrating the process of emulating and analyzing code for malicious behavior in accordance with an embodiment of the present invention. The system starts by receiving code 108 (see FIG. 1) within computer system 106 (step 302). The system stores code 108 in emulator buffer 201 and then emulates the code (step 304).

During the emulation process, the system records system calls (API calls) generated by code 108 (step 306). The system also emulates the execution of the system calls to the extent necessary to accurately predict the execution path through code 108 (step 308). Next, comparison unit 204 applies comparison rules 210 in order to compare the record of system calls against profiles of system calls generated by known malicious code (step 310). Recall, that this comparison process can take place on-the-fly as the system calls are generated, or alternatively, off-line, after a number of system calls a generated. During this comparison process the system determines if the record of system calls indicates that code 108 is likely to exhibit malicious behavior (step 312).

The above process is repeated until a termination condition is encountered. For example, the process can repeat until: the emulation completes, a maximum number of instructions are executed during the emulation, a maximum number of system calls are made during the emulation, or the pattern of system calls is determined to exhibit malicious behavior.

The system then reports results of the analysis to a user of computer system 106 (step 314). These results may include indicating the code 108 is unlikely to exhibit malicious behavior, or alternatively, that code 108 is likely to exhibit malicious behavior.

EXAMPLE

For example, suppose system calls generated by code 108 during emulation (1) modify the RunOnce registry key and (2) create a file (possibly a copy of code 108) which is launched every time the computer restarts. Also suppose (3) the system calls listen to a non-standard port. (This is an action commonly performed by network sniffers.)

None of these actions is enough on its own to indicate that the program is exhibiting suspicious behavior. However, if all of these actions are performed by a single piece of code 108, the piece of code 108 is very likely to be a backdoor program that provides a mechanism by which an intruder can break into computer system 106.

As an example, the profile of system calls that cause this behavior can be expressed as follows within database 206.

1. {system call to modify the registry key(s) responsible for launching applications at startup}
2. {wildcard—any number of intervening system calls}
3. {system call to write an executable file with a name used in step 1}
4. {wildcard—any number of intervening system calls}
5. {system call to open a port for listening}

In order to detect such a pattern, comparison unit 204 can be configured to assign weights to system calls. Weights can be positive for suspicious activity, and negative for activity which is more likely to be present in non-malicious code. The system can keep a count of the total weight, which is compared against a threshold value. If the total weight equals or exceeds this threshold value, the system can report the code as suspicious.

For example, suppose the weights for items 1, 3 and 5 above are, 20, 20 and 30, respectively. Also suppose the threshold value is 50. In this case, the system will indicate that the code is suspicious if the code opens a port for listening, and beforehand either modifies an appropriate registry key or writes to an executable file.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining whether software is likely to exhibit malicious behavior by analyzing patterns of system calls made during emulation of the software, comprising:
   receiving the software;
   emulating the software within an insulated environment in a computer system so that the computer system is insulated from malicious actions of the software;
   recording a pattern of system calls directed to an operating system of the computer system during emulation of the software;
   comparing the pattern of system calls against a database containing suspect patterns of system calls;
   determining whether the software is likely to exhibit malicious behavior based upon the comparison; and
   terminating the method if one of the following occurs:
      a maximum number of instructions are executed during the emulation, and
      a maximum number of system calls are made during the emulation.

2. The method of claim 1, further comprising if the software is determined to be likely to exhibit malicious behavior, reporting that the software is likely to exhibit malicious behavior to a user of the computer system.

3. The method of claim 1, wherein the process of comparing the pattern of system calls is performed on-the-fly as the emulation generates system calls.

4. The method of claim 1, wherein emulating the software further comprises emulating the generation of results for system calls made by the software during the emulation, so that the emulation accurately follows an actual execution path through the software.

5. The method of claim 1, wherein receiving the software includes receiving the software encoded on a computer-readable storage medium.

6. The method of claim 1, wherein receiving the software includes receiving the software across a network.

7. The method of claim 1, wherein recording the pattern of system calls includes recording parameters of individual system calls within the pattern of system calls.

8. The method of claim 1, wherein comparing the pattern of system calls includes computing a function of the pattern of system calls.

9. The method of claim 1, wherein the pattern includes a system call to modify a registry key responsible for launching an application at startup.

10. The method of claim 1, wherein the pattern includes a wildcard.

11. The method of claim 1, wherein the pattern includes a system call to open a port for listening.

12. A computer-readable storage medium storing instructions that when executed by a computer cause the computer to perform a method for determining whether software is likely to exhibit malicious behavior by analyzing patterns of system calls made during emulation of the software, the method comprising:
   receiving the software;
   emulating the software within an insulated environment in a computer system so that the computer system is insulated from malicious actions of the software;
   recording a pattern of system calls directed to an operating system of the computer system during emulation of the software;
   comparing the pattern of system calls against a database containing suspect patterns of system calls;
   determining whether the software is likely to exhibit malicious behavior based upon the comparison; and
   terminating the method if one of the following occurs:
      a maximum number of instructions are executed during the emulation, and
      a maximum number of system calls are made during the emulation.

13. The computer-readable storage medium of claim 12, wherein the method further comprises, if the software is determined to be likely to exhibit malicious behavior, reporting that the software is likely to exhibit malicious behavior to a user of the computer system.

14. The computer-readable storage medium of claim 12, wherein comparing the pattern of system calls takes place on-the-fly as the emulation generates system calls.

15. The computer-readable storage medium of claim 12, wherein emulating the software further comprises emulating the generation of results for system calls made by the software during the emulation, so that the emulation accurately follows an actual execution path through the software.

16. The computer-readable storage medium of claim 12, wherein receiving the software includes receiving the software encoded on a computer-readable storage medium.

17. The computer-readable storage medium of claim 12, wherein receiving the software includes receiving the software across a network.

18. The computer-readable storage medium of claim 12, wherein recording the pattern of system calls includes recording parameters of individual system calls within the pattern of system calls.

19. The computer-readable storage medium of claim 12, wherein comparing the pattern of system calls includes computing a function of the pattern of system calls.

20. An apparatus that determines whether software is likely to exhibit malicious behavior by analyzing patterns of system calls made during emulation of the software, comprising:

a receiving mechanism that receives the software;

an emulator that emulates the software within an insulated environment in a computer system so that the computer system is insulated from malicious actions of the software;

a recording mechanism that records a pattern of system calls directed to an operating system of the computer system during emulation of the software;

a comparison mechanism that compares the pattern of system calls against a database containing suspect patterns of system calls; and a determination mechanism that determines whether the software is likely to exhibit malicious behavior based upon the comparison;

wherein termination occurs if one of the following occurs:
a maximum number of instructions are executed during the emulation, and
a maximum number of system calls are made during the emulation.

21. The apparatus of claim 20, further comprising a reporting mechanism that is configured to report that the software is likely to exhibit malicious behavior to a user of the computer system if the determination mechanism determines that the software is likely to exhibit malicious behavior.

22. The apparatus of claim 20, wherein the comparison mechanism is configured to perform comparisons on-the-fly as the emulator generates system calls.

23. The apparatus of claim 20, wherein the emulator is configured to emulate the generation of results for system calls made by the software, so that the emulator accurately follows an actual execution path through the software.

24. The apparatus of claim 20, wherein the receiving mechanism is configured to receive the software encoded on a computer-readable storage medium.

25. The apparatus of claim 20, wherein the receiving mechanism is configured to receive the software across a network.

26. The apparatus of claim 20, wherein the recording mechanism is configured to record parameters of individual system calls within the pattern of system calls.

27. The apparatus of claim 20, wherein the comparison mechanism is configured to compare the pattern of system calls by computing a function of the pattern of system calls.

* * * * *

UNITED STATES PATENT AND TRADEMARK OFFICE
CERTIFICATE OF CORRECTION

| | |
|---|---|
| PATENT NO. | : 6,775,780 B1 |
| APPLICATION NO. | : 09/527385 |
| DATED | : August 10, 2004 |
| INVENTOR(S) | : Igor Muttik |

It is certified that error appears in the above-identified patent and that said Letters Patent is hereby corrected as shown below:

1. In Column 2, line 49, replace "Within" with --within--

2. In Column 2, line 60, following "the" insert --present invention.--

3. In Column 2, line 63, following "the" delete ","

Signed and Sealed this

Second Day of January, 2007

JON W. DUDAS
*Director of the United States Patent and Trademark Office*